(12) United States Patent
Tang

(10) Patent No.: US 11,644,637 B2
(45) Date of Patent: May 9, 2023

(54) THERMAL IMAGING DEVICE

(71) Applicant: HANGZHOU HIKMICRO SENSING TECHNOLOGY CO., LTD., Hangzhou (CN)

(72) Inventor: Jun Tang, Hangzhou (CN)

(73) Assignee: HANGZHOU HIKMICRO SENSING TECHNOLOGY CO, LTD., Hangzhou (CN)

( * ) Notice: Subject to any disclaimer, the term of this patent is extended or adjusted under 35 U.S.C. 154(b) by 329 days.

(21) Appl. No.: 16/648,960

(22) PCT Filed: Aug. 3, 2018

(86) PCT No.: PCT/CN2018/098470
§ 371 (c)(1),
(2) Date: Mar. 19, 2020

(87) PCT Pub. No.: WO2019/085566
PCT Pub. Date: May 9, 2019

(65) Prior Publication Data
US 2021/0011250 A1    Jan. 14, 2021

(30) Foreign Application Priority Data

Oct. 30, 2017  (CN) .......................... 201721417322.1
Dec. 8, 2017   (CN) .......................... 201721704316.4
Jan. 9, 2018   (CN) .......................... 201820032982.6

(51) Int. Cl.
*G02B 7/04* (2021.01)
*G02B 7/02* (2021.01)
(Continued)

(52) U.S. Cl.
CPC ............... *G02B 7/04* (2013.01); *G02B 7/022* (2013.01); *H04N 5/2252* (2013.01);
(Continued)

(58) Field of Classification Search
CPC .. G01J 5/00; G02B 7/022; G02B 7/04; H01H 23/06; H01H 23/16; H04N 5/2252; H04N 5/2254; H04N 5/33
(Continued)

(56) References Cited

U.S. PATENT DOCUMENTS

| 4,160,590 A | * | 7/1979 | Reynard | .................. | G02B 7/40 |
| | | | | | 396/137 |
| 7,885,530 B1 | * | 2/2011 | Bushnell, III | ........... | G02B 7/04 |
| | | | | | 359/825 |

(Continued)

FOREIGN PATENT DOCUMENTS

| CN | 102385139 | 3/2012 |
| CN | 204809084 | 11/2015 |

(Continued)

OTHER PUBLICATIONS

Supplementary Partial European Search Report issued in Corresponding European Application No. 18874966.7, dated Oct. 15, 2020.

(Continued)

*Primary Examiner* — Christopher S Kelley
*Assistant Examiner* — Kathleen M Walsh
(74) *Attorney, Agent, or Firm* — Norton Rose Fulbright US LLP

(57) ABSTRACT

A thermal imaging device, comprising: a housing (3), which comprises a front housing (31); a lens mount (1), fixedly connected to the front housing (31), a sealing gasket (2) being provided between the front housing (31) and the lens mount (1); a lens (4), threaded with the lens mount (1); and a manual lens focusing structure, comprising a focusing wheel (8) and an axial positioning structure, wherein the focusing wheel (8) and the lens (4) are connected to each other in a synchronous rotation and relative axial movement (Continued)

mode, and the axial positioning structure implements axial positioning on the focusing wheel (8). In the process of focusing, the lens (4) axially moves with respect to the focusing wheel (8), and the focusing wheel (8) may not move axially due to the axial positioning structure.

18 Claims, 15 Drawing Sheets

(51) Int. Cl.
    *H04N 5/225*      (2006.01)
    *H01H 23/06*      (2006.01)
    *H01H 23/16*      (2006.01)

(52) U.S. Cl.
    CPC ........... *H04N 5/2254* (2013.01); *H01H 23/06* (2013.01); *H01H 23/16* (2013.01)

(58) Field of Classification Search
    USPC ......................................................... 348/164
    See application file for complete search history.

(56) References Cited

U.S. PATENT DOCUMENTS

| | | | | |
|---|---|---|---|---|
| 9,632,392 | B1* | 4/2017 | Weidner | G03B 3/00 |
| 9,638,886 | B1* | 5/2017 | Weidner | G02B 7/08 |
| 2007/0196094 | A1* | 8/2007 | Chiang | G02B 7/04 |
| | | | | 396/144 |
| 2012/0281296 | A1* | 11/2012 | Ozawa | G03B 3/02 |
| | | | | 359/700 |
| 2013/0129335 | A1* | 5/2013 | Gainer | G03B 17/565 |
| | | | | 396/144 |
| 2014/0036068 | A1 | 2/2014 | Nguyen et al. | |
| 2014/0267879 | A1* | 9/2014 | Loukusa | G02B 7/04 |
| | | | | 396/147 |
| 2017/0257577 | A1* | 9/2017 | Woolfenden | H04N 5/2254 |

FOREIGN PATENT DOCUMENTS

| | | |
|---|---|---|
| CN | 106671032 | 5/2017 |
| CN | 107422451 | 12/2017 |
| CN | 207439552 | 6/2018 |
| CN | 207458823 | 6/2018 |
| EP | 2278288 | 1/2011 |
| JP | H01318468 | 12/1989 |
| JP | 2016033558 | 3/2016 |
| KR | 101001602 | 12/2010 |
| WO | WO 2012/027739 | 3/2012 |

OTHER PUBLICATIONS

Supplementary Partial European Search Report issued in Corresponding European Application No. 18874236.5, dated Oct. 15, 2020.
Extended European Search Report issued in Corresponding European Application No. 18874966.7, dated Jan. 21, 2021.
International Search Report and Written Opinion issued in corresponding PCT application No. PCT/CN2018/098470, dated Oct. 17, 2018 (English Translation of International Search Report provided).

* cited by examiner

THERMAL IMAGING DEVICE

CROSS REFERENCE TO RELATED APPLICATIONS

The present application is a national phase application under 35 U.S.C. § 371 of International Application No. PCT/CN2018/098470, filed Aug. 3, 2018, which claims the benefit of priority to Chinese patent application No. 201721417322.1, filed with the China National Intellectual Property Administration on Oct. 30, 2017 and entitled "Trigger key assembly and thermal imaging device having the same", Chinese patent application No. 201721704316.4, filed with the China National Intellectual Property Administration on Dec. 8, 2017 and entitled "Handheld infrared imager", and Chinese patent application No. 201820032982.6, filed with the China National Intellectual Property Administration on Jan. 9, 2018 and entitled "Manual focusing lens structure and handheld infrared imager", each of which are incorporated herein by reference in their entirety.

TECHNICAL FIELD

The present application relates to the field of imaging technology, in particular to a thermal imaging device.

BACKGROUND

For thermal imaging devices, such as a handheld infrared imager, in general, the focusing wheel and the lens are locked. During manual focusing, the rotation of the focusing wheel drives the lens to move forward and backward, so as to achieve focusing.

In this focusing method, the focusing wheel moves forward and backward with the lens, then each time when focusing, the focusing wheel is in a different position, the focusing wheel needs to be found accordingly, and the focusing can be achieved by turning the focusing wheel, which makes use experience of an entire product decline.

SUMMARY

In embodiments of the present application, focusing refers to an adjustment process of changing distance from the lens optical center to the film plane to obtain a clear image of an object.

An embodiment of the present application provides a thermal imaging device, so that during the focusing, the focusing wheel is always maintained at a set axial position to improve the use experience.

An embodiment of the present application provides a thermal imaging device, the thermal imaging device includes:

a housing, which includes a front housing;

a lens mount, fixedly connected to the front housing, and wherein a sealing gasket is provided between the front housing and the lens mount;

a lens, threaded with the lens mount;

a manual lens focusing structure, including a focusing wheel and an axial positioning structure, wherein the focusing wheel and the lens are connected to each other in a manner of synchronous rotation and relative axial movement mode; the axial positioning structure axially positions the focusing wheel.

In the thermal imaging device of the embodiments of the present application, an axial positioning of the focusing wheel is provided, and the focusing wheel mates with the lens of the thermal imaging device. In this way, when the focusing wheel rotates, the lens is driven to rotate, thereby achieving focusing. During the focusing process, the lens moves axially with respect to the focusing wheel, and the focusing wheel does not move axially because of the axial positioning structure. In this way, the product experience is greatly enhanced, while ensuring that the overall appearance is not affected during the focusing process.

BRIEF DESCRIPTION OF THE DRAWINGS

In order to more clearly describe the technical solutions of the present application and those of the prior art, drawings used to illustrate embodiments and the prior art will be briefly described below. Obviously, the drawings in the following description are just some embodiments of the present application. For those of ordinary skill in the art, other drawings can be obtained according to these drawings without creative efforts.

FIG. 19b is a schematic view of the assembled trigger fixing mount, sealing gasket, key structure, and PCB board sealing gasket in FIG. 19a;

REFERENCE NUMERALS

Figure 1:
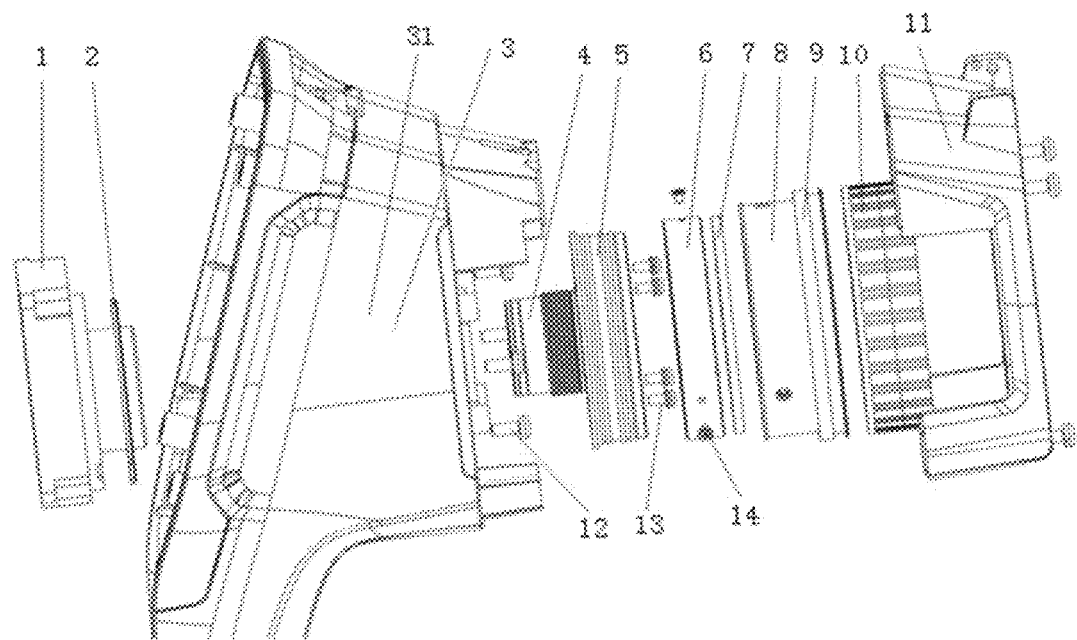
FIG. 1 is a schematic exploded view of a thermal imaging device according to an embodiment of the present application.

| 1   | Lens mount                              | 21  | Torsion spring                           |
|-----|-----------------------------------------|-----|------------------------------------------|
| 2   | Sealing gasket                          | 22  | Rotating connection member               |
| 3   | Housing                                 | 23  | Key PCB board                            |
| 4   | Lens                                    | 24  | PCB board sealing gasket                 |
| 5   | Limit seat                              | 25  | Sealing washer                           |
| 6   | Rotating ring                           | 31  | Front housing                            |
| 7   | Clamping ring                           | 32  | Rear housing                             |
| 8   | Focusing wheel                          | 33  | First buckling portion                   |
| 9   | Decorative ring                         | 34  | Ledge                                    |
| 10  | Handwheel rubber                        | 41  | Key                                      |
| 11  | Front cover                             | 51  | Grease groove                            |
| 12  | First screw                             | 52  | Radial expansion portion                 |
| 13  | Second screw                            | 81  | Straight groove                          |
| 14  | Fastening screw                         | 161 | Upper cover                              |
| 15  | Display screen                          | 162 | Side cover                               |
| 16  | Light shield                            | 163 | Second buckling portion                  |
| 17  | Electronic device                       | 171 | Movement                                 |
| 18  | Sealing member                          | 172 | Battery                                  |
| 19  | Trigger fixing mount                    | 191 | Trigger mounting lug                     |
| 20  | Trigger                                 | 192 | Shaft mounting hole of trigger fixing mount |
| 201 | Shaft mounting hole of trigger          | 211 | Torsion arm of torsion spring            |
| 212 | Torsion arm positioning hole of trigger | 231 | Mounting through-hole of key PCB board   |
| 232 | First side of key PCB board             | 233 | Second side of key PCB board             |
| 234 | Switch contacting portion of key PCB board | 235 | Socket                                |
| 241 | Cushion block                           | 242 | Pressing projection                      |
| 243 | Mounting pole                           | 244 | Flange                                   |
| a   | Transition portion of flange            |     |                                          |

DETAILED DESCRIPTION

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All further embodiments obtained by those of ordinary skills in the art based on the embodiments herein without any creative efforts are within the scope of the present application.

In the drawings, the same or similar reference numerals are used to indicate the same or similar elements or elements having the same or similar functions. The following describes the present application in detail with reference to the drawings.

In the description of the present application, directions or positional relationships indicated by terms "center", "longitudinal", "lateral", "front", "rear", "left", "right", "vertical", "horizontal", "top", "bottom", "inside", "outside", etc. are based on the directions or positional relationships shown in the drawings, and are only for the convenience of describing the present application and simplifying the description, and are not intended to indicate or imply that the referred apparatus or element must have a specific orientation, structure and operation in a specific orientation, so it cannot be understood as a limitation on the scope of application for protection.

Figure 2:
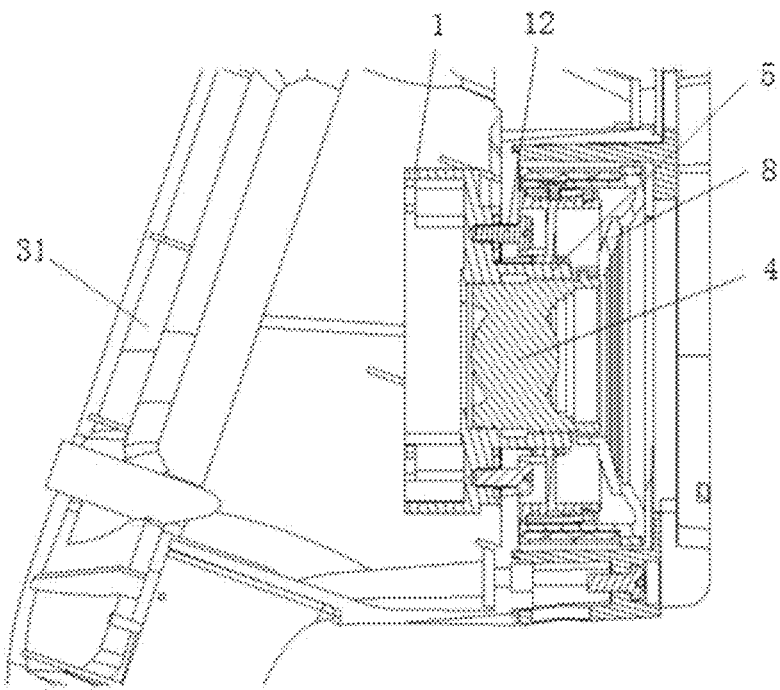
FIG. 2 is a schematic partial cross-sectional view of a thermal imaging device according to an embodiment of the present application.
Figure 3:
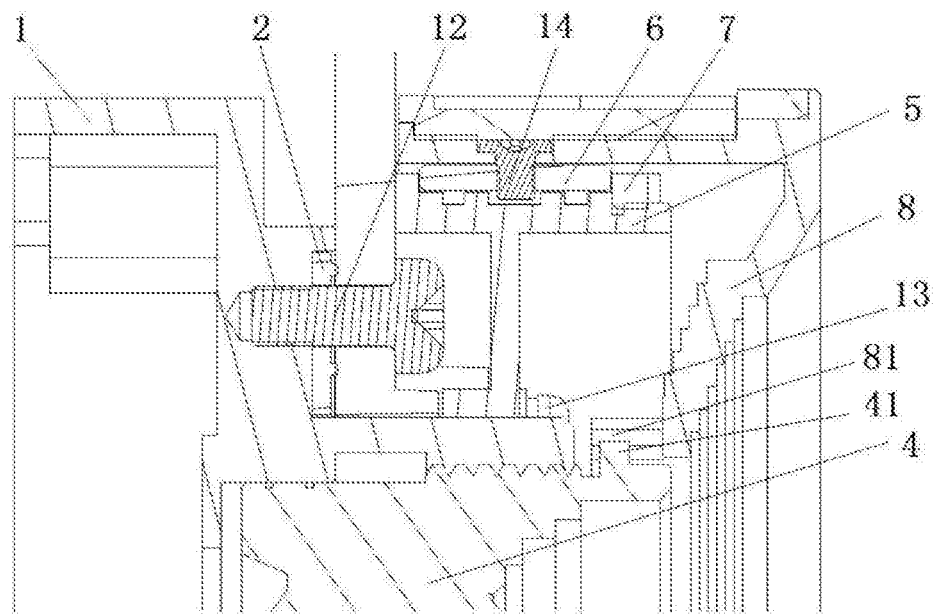
FIG. 3 is a partial enlarged view of FIG. 2.

The following describes the present application in detail with reference to the drawings. A manual lens focusing structure provided by the embodiment of the present application may be included in a thermal imaging device such as a handheld infrared imager. FIG. 1 is a schematic exploded view of a thermal imaging device according to an embodiment of the present application. FIG. 2 is a schematic partial cross-sectional view of a thermal imaging device according to an embodiment of the present application. FIG. 3 is a partial enlarged view of FIG. 2. As shown in FIGS. 1 to 3, the thermal imaging device of an embodiment of the present application includes: a housing 3 (including a front housing 31), a lens mount 1, a lens 4 and a manual lens focusing structure, the manual lens focusing structure of an embodiment of the present application includes: a focusing wheel 8 and an axial positioning structure. The focusing wheel 8 and the lens 4 are connected to each other in a manner of synchronous rotation and relative axial movement. For example, the focusing wheel 8 and the lens 4 are connected to each other in a synchronous rotation mode through a keyway fit. That is, the focusing wheel 8 can drive the lens 4 to rotate, and convert the rotation of the lens 4 into an axial movement, thereby achieving focusing.

Any suitable structure may be used to realize a connection relationship between the focusing wheel and the lens, which rotates synchronously but can move relatively axially. For example, structures such as a flat key and a spline can be used. Both the flat key and the spline are set axially. In one example, a radial protrusion (such as a spline) is provided on the outer periphery of the lens, and a radially concave groove (such as a spline groove) is correspondingly provided on the focusing wheel. In another example, a circumferentially aligned groove is provided on the outer periphery of the lens and the focusing wheel, and a key is provided in the groove. Advantageously, lubricant or grease is provided between the focusing wheel and the lens, especially at the aforementioned keyway fit structure.

The axial positioning structure axially positions the focusing wheel 8 and prevents the focusing wheel 8 from moving axially during the rotation of the focusing wheel 8. That is, the focusing wheel 8 only rotates, but does not perform axial movement. In other words, during the focusing process, the focusing wheel 8 rotates synchronously with respect to the lens, but does not move axially along with the lens.

In the manual lens focusing structure according to the embodiment of the present application, an axial positioning of the focusing wheel is provided, and the focusing wheel mates with the lens through a guiding activity of a key way. In this way, when the focus wheel rotates, the lens moves axially through the cooperation of the key way, and the focus wheel does not move axially because of forward and backward limits. As a result, the use experience of the product is enhanced, while ensuring that the overall appearance may not be affected.

The lens 4 may be any suitable lens. Optionally, the thermal imaging device may be a handheld infrared imager, and the lens 4 may be an infrared lens provided on the handheld infrared imager.

Figure 9:
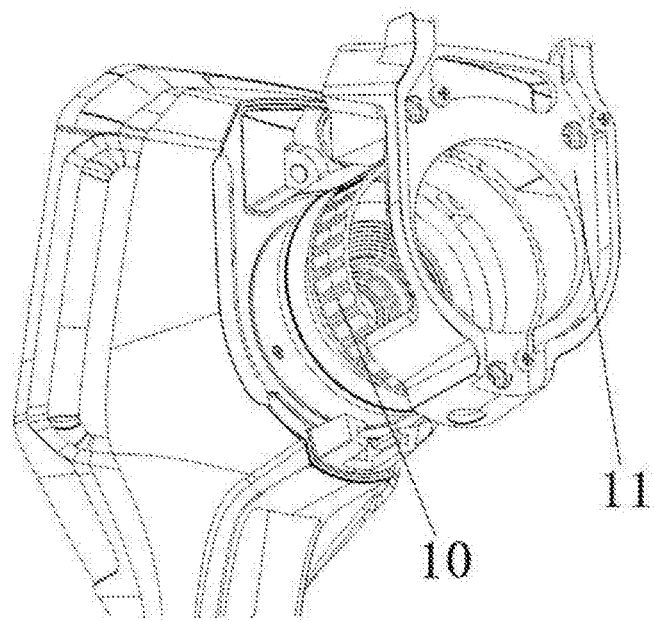
FIG. 9 is a schematic view of an installation manner of a handwheel rubber, a front cover, and the like according to an embodiment of the present application.
Figure 10:
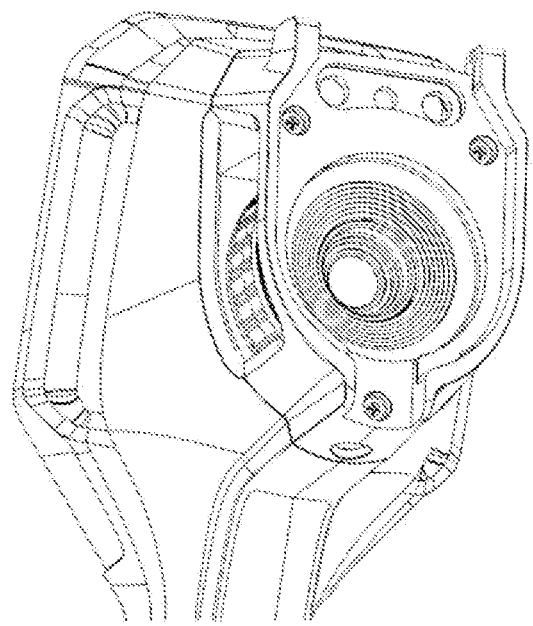
FIG. 10 is a schematic perspective view of a manual lens focusing structure according to an embodiment of the present application.

Referring to FIG. 1 and FIG. 9, in order to improve hand feeling during focusing, a handwheel rubber 10 is provided on the focusing wheel 8. In order to increase the aesthetic feeling, a decorative ring 9 may be provided on the focus wheel 8. Both the handwheel rubber 10 and the decorative ring 9 are sleeved on the radial outer periphery of the focusing wheel 8. Multiple axially extending stripes are provided on the outer periphery of the handwheel rubber 10 to increase friction. Actually, when performing manual focusing, the operator rotates the handwheel rubber 10, and then the focusing wheel 8 drives the lens 4 to rotate.

Figure 4:
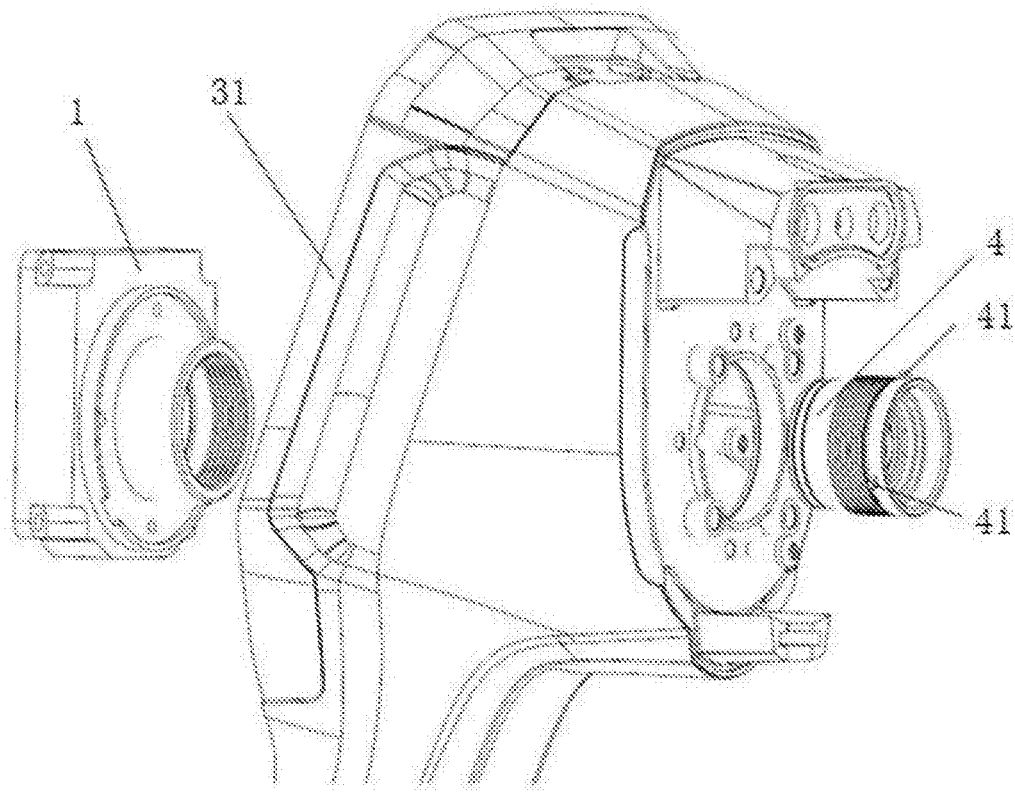
FIG. 4 is a schematic view of an installation manner of a lens mount and a lens according to an embodiment of the present application.

Referring to FIGS. 3 and 4, the inner wall of the focusing wheel 8 is provided with an axial straight groove 81. The axial straight groove 81 mates with a key 41 provided on the outer periphery of the lens 4. The key 41 can move axially in the axial straight groove 81. The cooperation of the axial straight groove 81 of the focusing wheel 8 and the key 41 of the lens 4 makes the rotation of the focusing wheel 8 and the lens 4 synchronous, but the two can move relative to each other in the axial direction. It is also possible to provide a key on the focusing wheel, and to provide an axial straight groove on the lens, which is also within the protection scope of the embodiment of the present application. The specific shape of the key 41 can be set as required. In addition, the number of the axial straight grooves 81 and the keys 41 can also be set as required, and is not limited to the arrangement of three circumferentially evenly distributed keyway fit in the illustrated embodiment of the present application.

In the illustrated embodiment, the key 41 is provided on the outer periphery of the lens 4 in an integrated structure. A groove may be provided on the outer periphery of the lens 4, and the key 41 may be provided in the groove and protrude from the groove.

Figure 8:
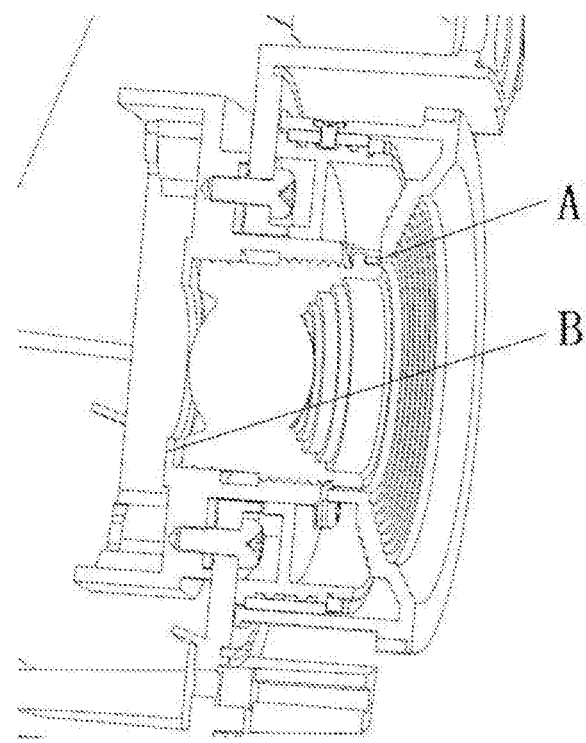
FIG. 8 is a schematic view of a focusing limit position according to an embodiment of the present application.

Optionally, as shown in FIG. 8, a rear end face of the lens 4 mates with the lens mount 1 to form a rear axial limit position of the lens 4 (B in FIG. 8); the key 41 of the lens 4 mates with an axial limit portion of the focusing wheel 8 to form a front axial limit position of the lens 4 (A in FIG. 8). The rear axial limit position and the front axial limit position limit a maximum axial movement range of the lens 4, that is, the maximum focusing range is limited. Other structures may also be used to limit a focusing range. The focusing limit position in the prior art is generally implemented by screws and grooves. In the embodiment of the present application, the rear end face of the lens can be mated with the lens mount, and the focusing wheel and the lens can be realized by keyway fit.

Figure 5A:
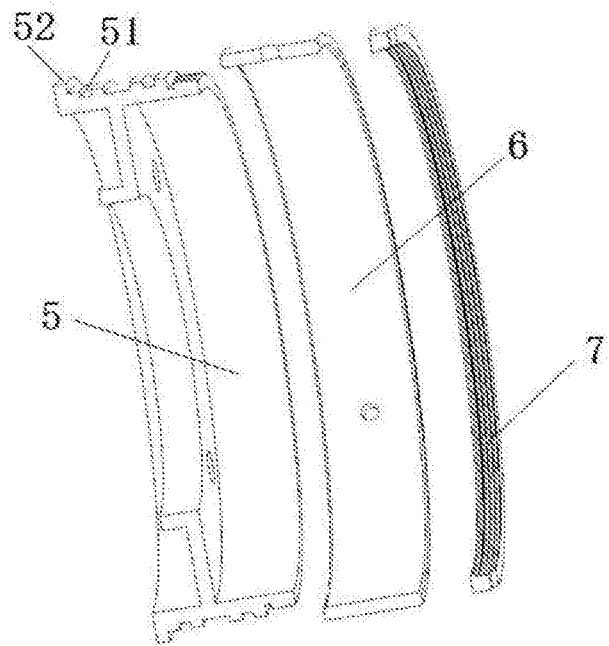
FIG. 5a is a schematic exploded view of a limit seat assembly according to an embodiment of the present application.
Figure 5B:
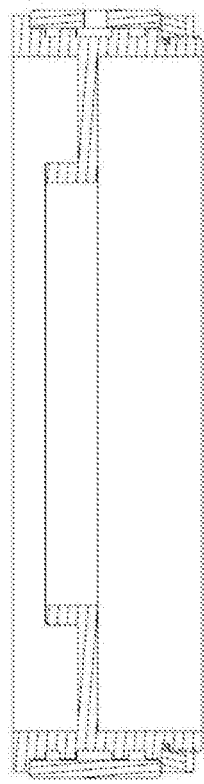
FIG. 5b is a schematic cross-sectional view of a limit seat assembly according to an embodiment of the present application.

Referring to FIGS. 5*a* and 5*b*, the axial positioning structure includes: a limit seat 5 and a rotating ring 6. The limit seat 5 can be fixed to a front housing 31 by a second screw 13; the limit seat 5 can also be fixed to other parts of the thermal imaging device. The rotating ring 6 is rotatably sleeved on a radially outer side of the limit seat 5. The rotating ring 5 is limited with respect to the limit seat 5. The focusing wheel 8 is integrally connected with the rotating ring 6, thereby limiting the axial movement of the focusing wheel 8.

A grease groove 51 may be provided on a radially outer periphery of the limit seat 5. Grease can be provided in the grease groove 51, which is used to provide lubrication for the rotation of the rotating ring 6 when the damping is too large during the process of the rotating ring 6 being sleeved to the limit seat 5. A damping grease can also be provided in the grease groove 51, which is used to provide damping for the rotating ring 6 when the damping is too small during the process of the rotating ring 6 being sleeved to the limit seat 5. Specific parameters such as the position, width, depth, and number of grease grooves 51 can be set as required.

The limit seat 5 includes an outer peripheral wall, an inner peripheral wall, and an annular plate connecting the outer peripheral wall and the inner peripheral wall. The rotating ring 6 is rotatably sleeved on the radially outer side of the outer periphery wall of the limit seat 5. A mounting through-hole is provided on the annular plate, and the second screw 13 is connected to the housing of the imaging device through the mounting through-hole, and may also be connected to the lens mount 1.

The axial positioning structure may also include a clamping ring 7. The clamping ring 7 is threaded with one end of the limit seat 5, and the other end of the limit seat 5 is provided with a radial expansion portion 52. The rotating ring 6 is sandwiched between the clamping ring 7 and the radial expansion portion 52 of the limit seat 5 in the axial direction. Specifically, the rotating ring 6 is sleeved on the outer periphery of the limit seat 5 and can rotate relative to the rotating ring 6. The clamping ring 7 is threaded with an external thread of the end of the limit seat 5, to form an axial limit position for the rotating ring 6. The distance between the clamping ring 7 and the radial expansion portion of the limit seat 5 is slightly larger than an axial dimension of the rotating ring 6. The difference between the distance and the axial dimension is appropriately set to ensure that the rotating ring 6 rotates smoothly without axial shaking. For example, the difference between the distance and the axial dimension is between 0.05 mm and 0.5 mm.

Referring to FIG. 3, the focusing wheel 8 is fixedly connected to the rotating ring 6 by a radially extending fastening screw 14. Optionally, three fastening screws 14 uniformly distributed in the circumferential direction are provided.

In the following, installation steps of the above manual lens focusing structure are briefly explained.

Firstly, a first component is assembled. The lens mount 1 and the front housing 31 are fixed with a first screw 12; the lens 4 is screwed into the lens mount 1 to form the first component. The sealing gasket 2 is sandwiched between the lens mount 1 and the front housing 31, to prevent external moisture from entering. Specifically, the lens mount 1 is provided with an internal thread, and the lens 4 is provided with an external thread. The external thread of the lens 4 is mated with the internal thread of the lens mount 1.

Secondly, the limit seat 5, the rotating ring 6, and the clamping ring 7 are assembled into a second component, to ensure that the rotating ring 6 can rotate smoothly without axial shaking.

Figure 6:
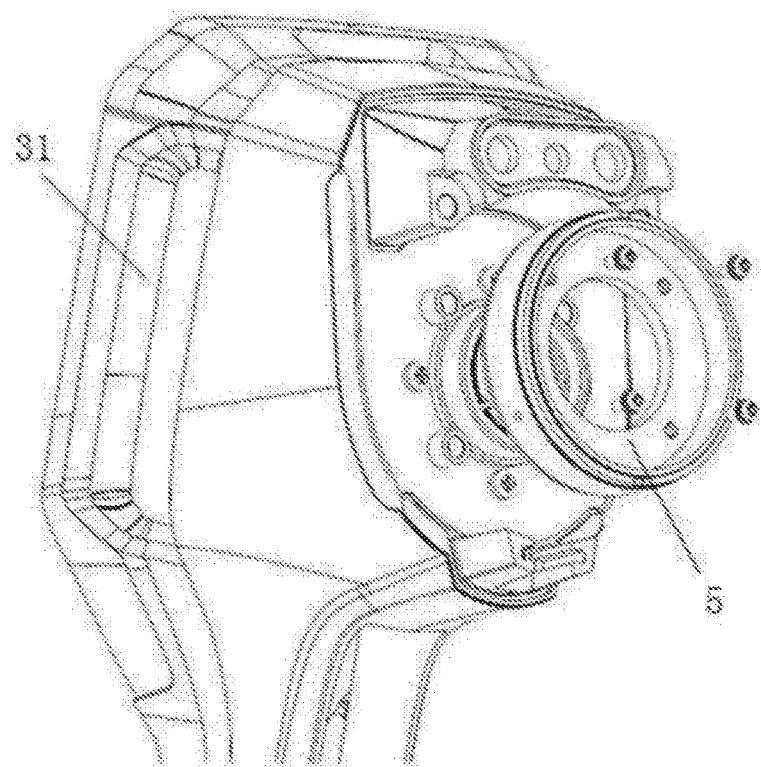
FIG. 6 is a schematic view of an installation manner of a limit seat assembly according to an embodiment of the present application.
Figure 7:
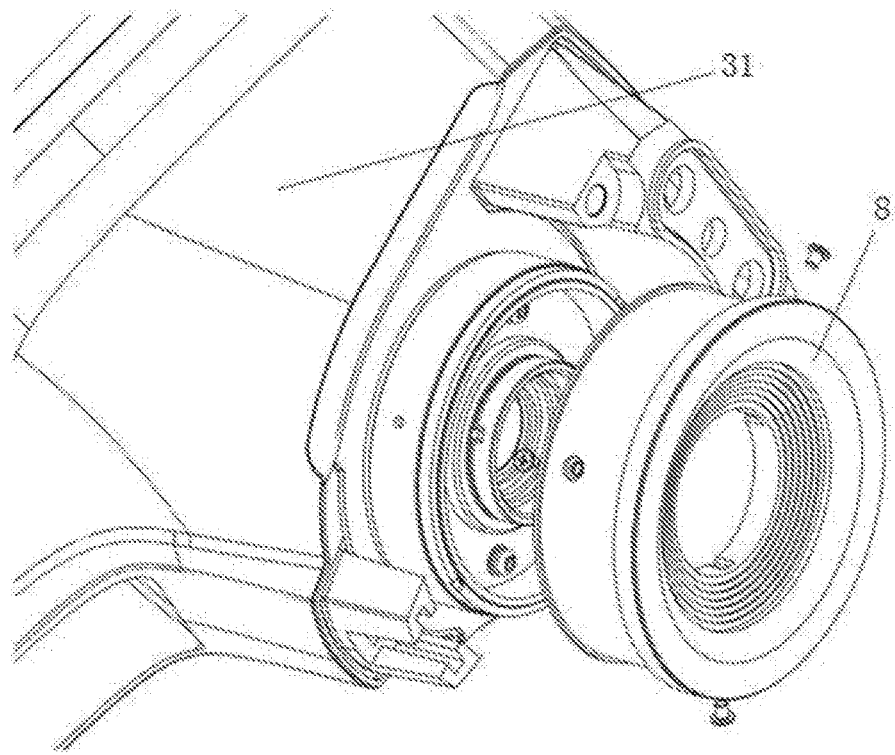
FIG. 7 is a schematic view of an installation manner of a focusing wheel according to an embodiment of the present application.

Thirdly, the second component is assembled and fixed to the first component, see FIG. 6. Specifically, the limit mount 5 is fixedly connected to the front housing 31 or the lens mount 1 by using the second screw 13.

Fourthly, after the straight groove 81 of the focusing wheel 8 is mated with the key 41 of the lens 4, and guided in, the focusing wheel 8 is sleeved on the rotating ring 6. Then, the focusing wheel 8 and the rotating ring 6 are fastened together using a radially extending fastening screw 14. Therefore, the focusing wheel 8 will drive the rotating ring 6 to rotate integrally.

Fifthly, the decoration ring 9, the handwheel rubber 10, the front cover 11 and the like are assembled.

The above manual lens focusing structure can be used for various imaging devices or detection devices that requires focusing. A specific application is a handheld infrared imager, which includes the manual lens focusing structure described above. In one embodiment, the handheld infrared imager includes: a front housing 31; a lens mount 1; a lens 4, a focusing wheel 8 and an axial positioning structure, etc. The front housing 31 is a part of the housing of the whole handheld infrared imager, and mates with the front cover 11, to define an accommodating space. The above manual lens focusing structure is generally accommodated in this accommodating space.

The lens mount 1 is fixedly connected to the front housing 31. Specifically, the lens mount 1 is fixed to the front housing 31 by a first screw 12. A sealing gasket 2 is provided between the front housing 31 and the lens mount 1, to prevent moisture from entering an inter space. The lens 4 is screwed to the lens mount 1. Specifically, the lens 4 is screwed into the lens mount 1. However, it is also possible to provide a threaded hole on the lens, and a stud on the lens mount, and screw the stud in the threaded hole on the lens.

The focusing wheel 8 is connected to the lens 1 in a synchronously rotating manner through a keyway fit. Specifically, as described above, various appropriate key way structures can be used to realize a connection between the focusing wheel and the lens 1. As long as the following functions can be achieved: the focusing wheel 8 and the lens 4 are synchronized in rotation, but both can move relative to the axial direction.

The axial positioning structure performs axial positioning of the focusing wheel 8 and may use any of the above specific structures.

Current thermal imaging devices generally also include a display screen and a light-shielding cover that shields the display screen. By setting the light-shielding cover, the light can be effectively blocked under a strong light condition, to prevent the light from directly hitting the display screen, so as to prevent the light from affecting the image of the display screen that the people observes. When manufacturing a thermal imaging device, in order to avoid the cost of increasing the thermal imaging device by opening mold of the light-shielding cover separately, the light-shielding cover and the housing are usually provided in an integrated structure. However, on occasions such as cloudy days or indoors where light intensity is weak, when the light-shielding cover is not needed, the light-shielding cover cannot be removed from the housing, affecting the use of thermal imaging device.

Figure 11:
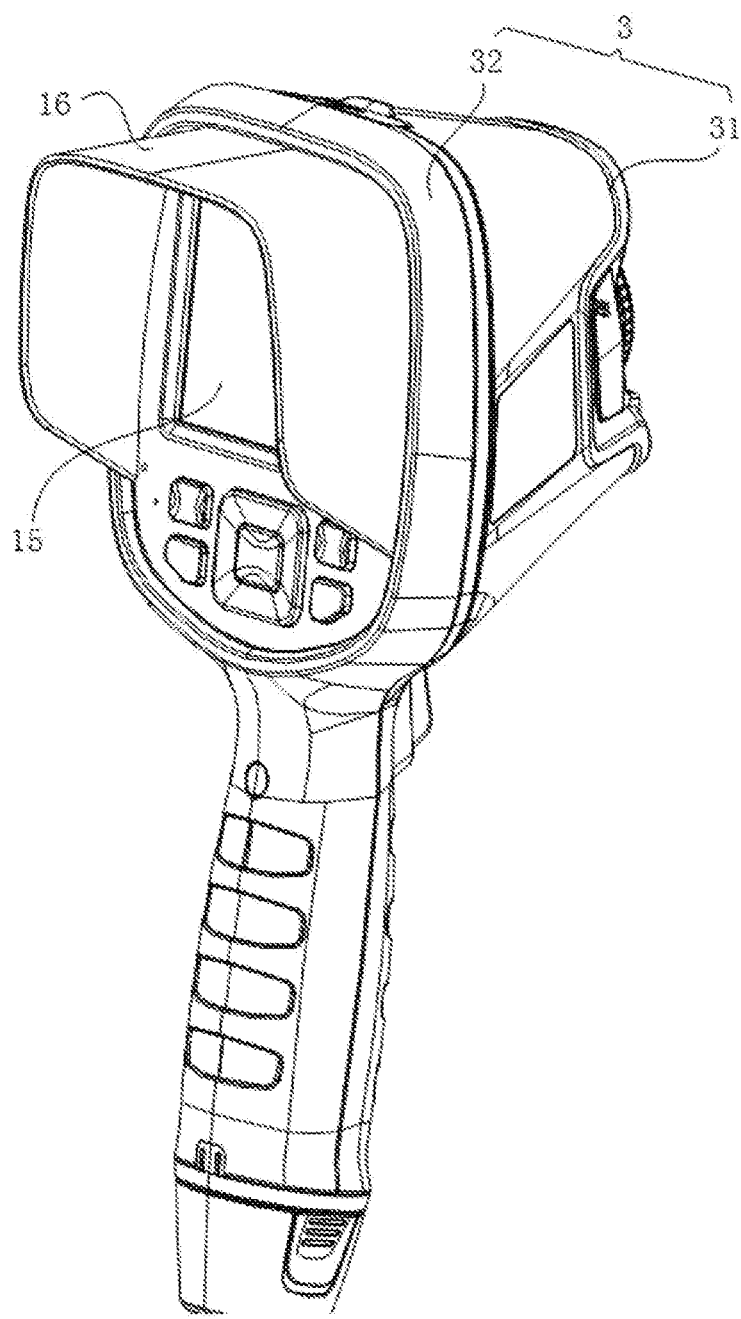
FIG. 11 is a schematic structural view of a thermal imaging device according to another embodiment of the present application.
Figure 12:
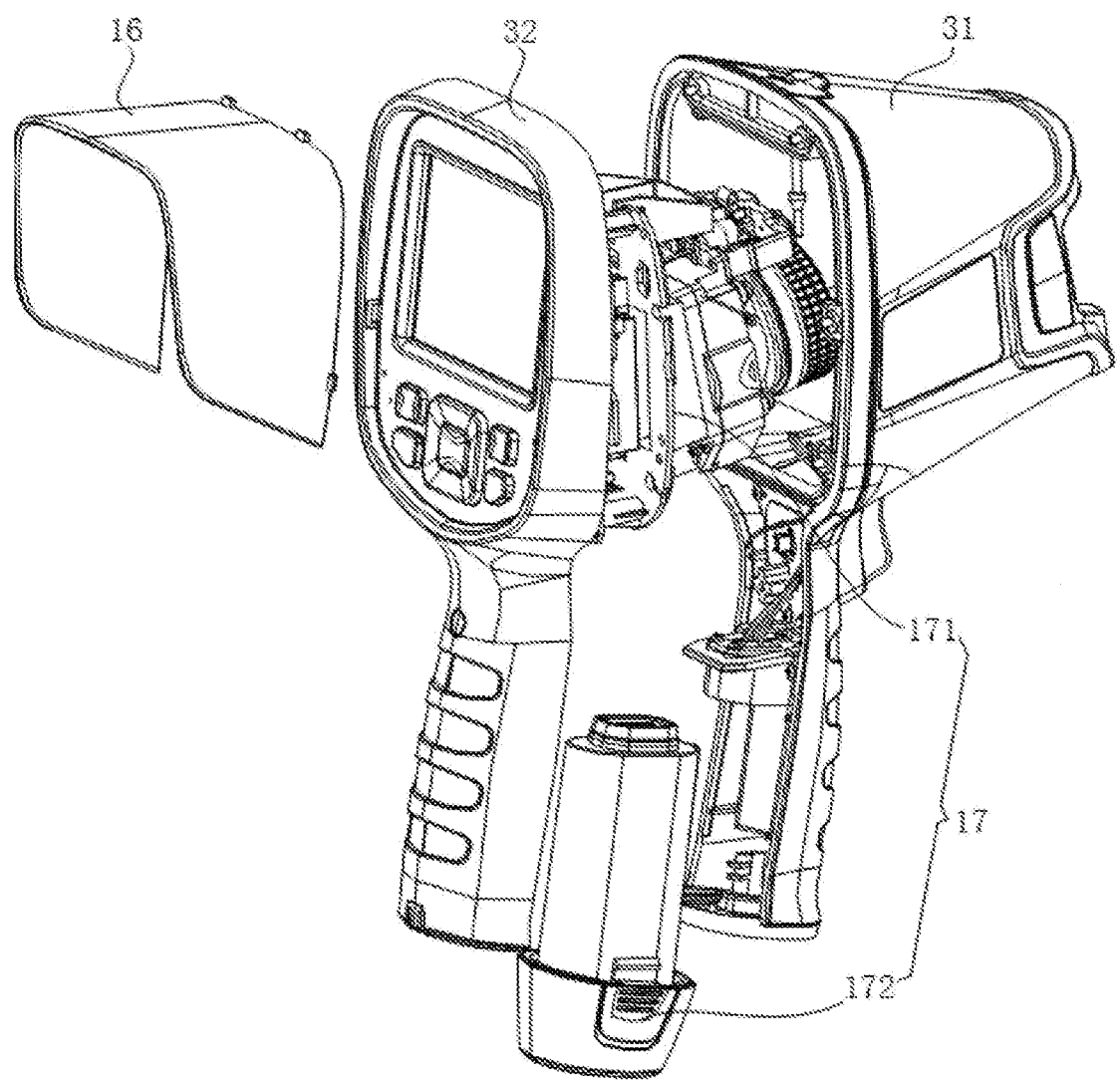
FIG. 12 is an exploded view of a thermal imaging device according to another embodiment of the present application.
Figure 13:
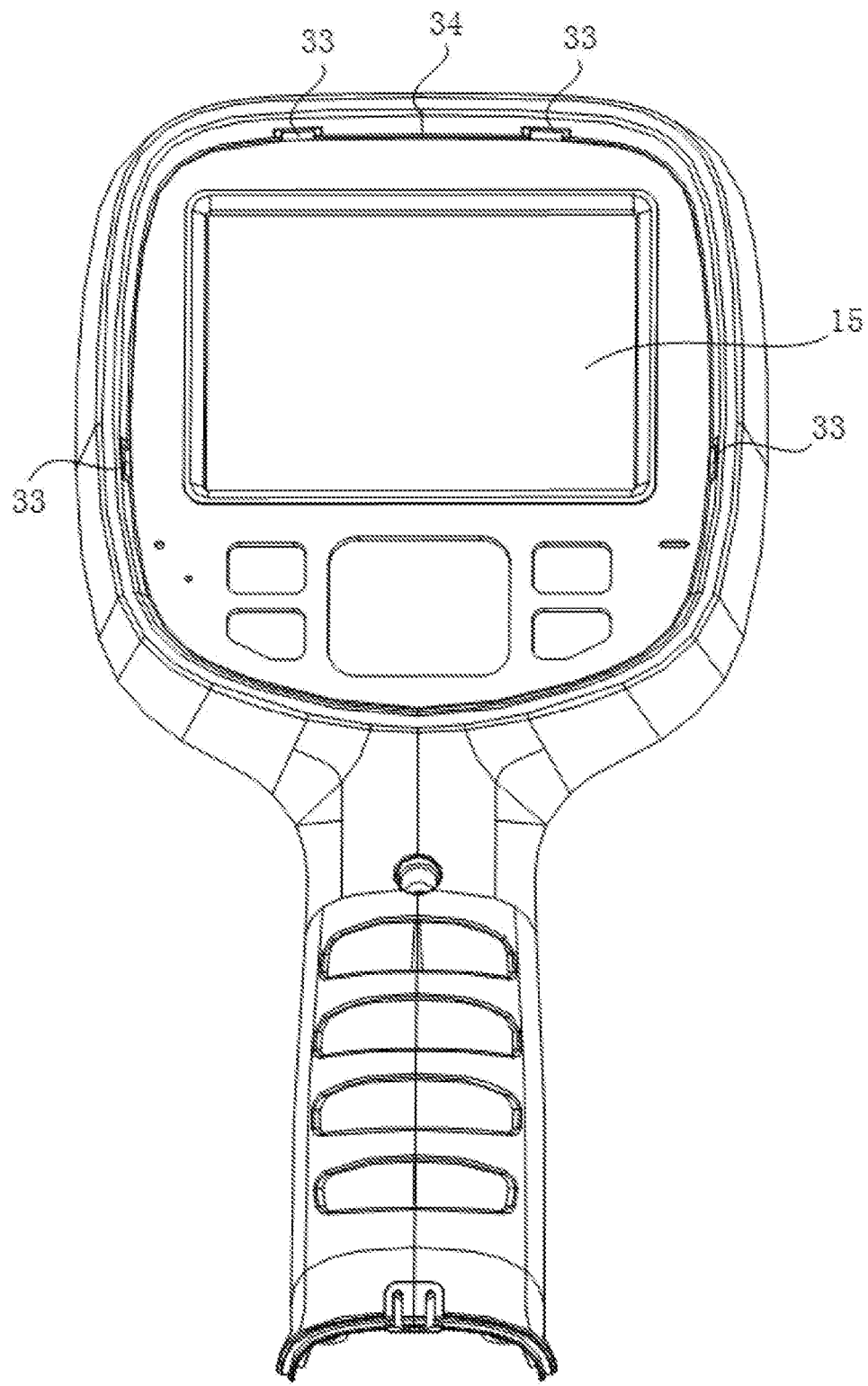
FIG. 13 is a schematic structural view of a side of a mounting display screen of a rear housing according to an embodiment of the present application.
Figure 14:
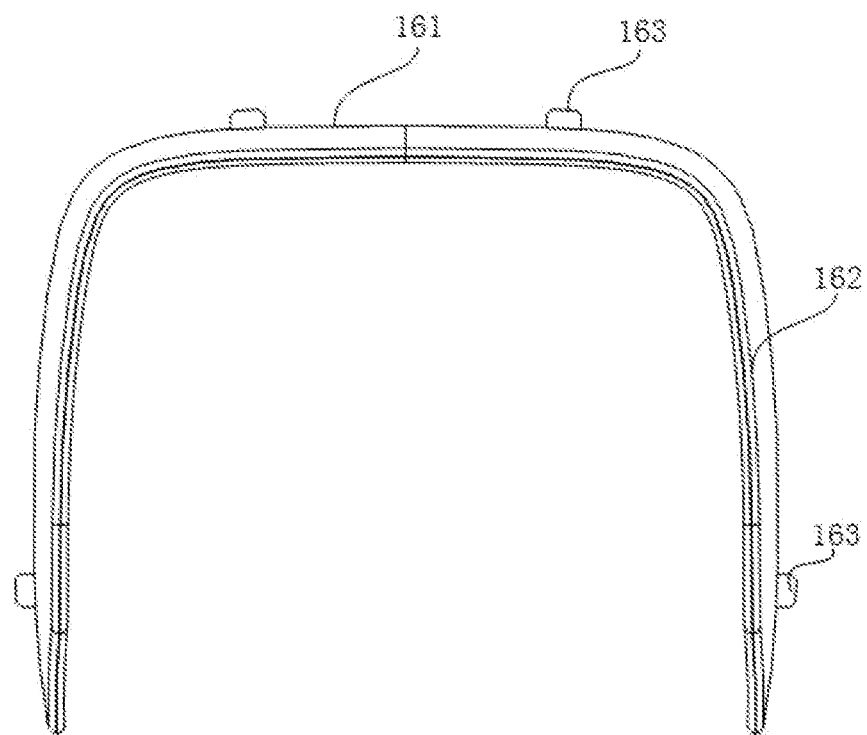
FIG. 14 is a schematic structural view of a light-shielding cover according to an embodiment of the present application.
Figure 15:
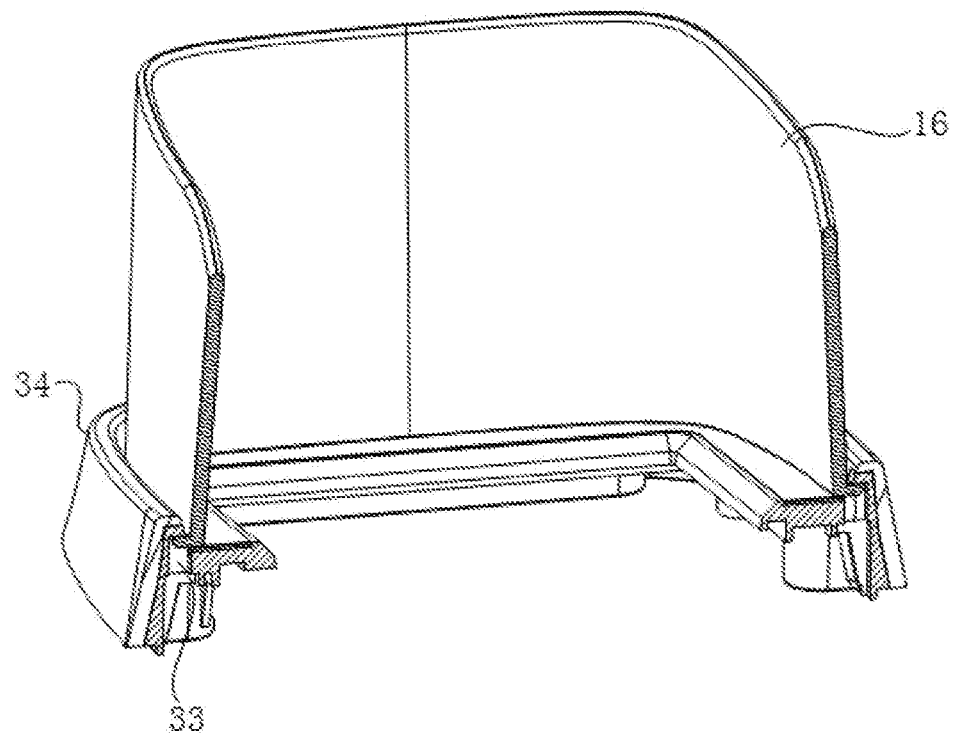
FIG. 15 is a schematic structural view of a first buckling portion and a second buckling portion being buckled according to an embodiment of the present application.

As shown in FIGS. 11 and 12, in addition to the housing 3, the lens mount 1, the lens 4, and the manual lens focusing structure as shown in FIG. 1, the thermal imaging device of another embodiment of the present application may also include a display screen 15 provided on the housing 3 and a light-shielding cover 16 provided outside the housing 3 to shield the display screen 15. An electronic device 17 is provided inside the housing 3, the display screen 15 is electrically connected to the electronic device 17. As shown in FIGS. 13 to 15, a first buckling portion 33 is provided outside the housing 3, and a second buckling portion 163 is provided on the light-shielding cover 16. When it is necessary to use the light-shielding cover 16, the light-shielding cover 16 is fixed to the housing 3 through the first buckling portion 33 and the second buckling portion 163. When it is not necessary to use the light-shielding cover 16, the second buckling portion 163 is withdrawn from the first buckling portion 33, and the light-shielding cover 16 is removed from the housing 3.

After the first buckling portion 33 and the second buckling portion 163 are provided, a detachable connection between the housing 3 and the light-shielding cover 16 can be achieved. In this way, when the light intensity is weak on cloudy days or indoors, when it is not necessary to use the light-shielding cover 16, the light-shielding cover 16 can be removed from the housing 3, thereby reducing the influence of the light-shielding cover 16 on the imager.

Each component of the thermal imaging device may have various structures. The following takes a specific embodiment as an example to introduce the structure of each component of the thermal imaging device in detail.

The housing 3 may include the front housing 31 and the rear housing 32, wherein the display screen 15 and the light-shielding cover 16 are provided on the rear housing 32. A groove can be provided on the front housing 31, and a convex rib can be provided on the rear housing 32. The rear housing 32 is fixed to the front housing 31 through the groove and the convex rib to improve the convenience of installation. The rear housing 32 is provided with a ledge 34 protruding backward (the rear is a direction away from the front housing 31). The ledge 34 and the display screen 15 are provided on the same face of the rear housing 32, and the ledge 34 is arranged around the outer circumference of the rear housing 32. The curved shape of inner and outer surfaces of the ledge 34 is the same as that of the side of the rear housing 32.

A first buckling portion 33 is provided on the ledge 34. Here, the first buckling portion 33 is preferably selected as a latching groove to facilitate processing. The number of first buckling portions 33 is the same as the number of second buckling portions 163, and each of the first buckling portions 33 is snapped into a different second buckling portion 163.

Figure 16:
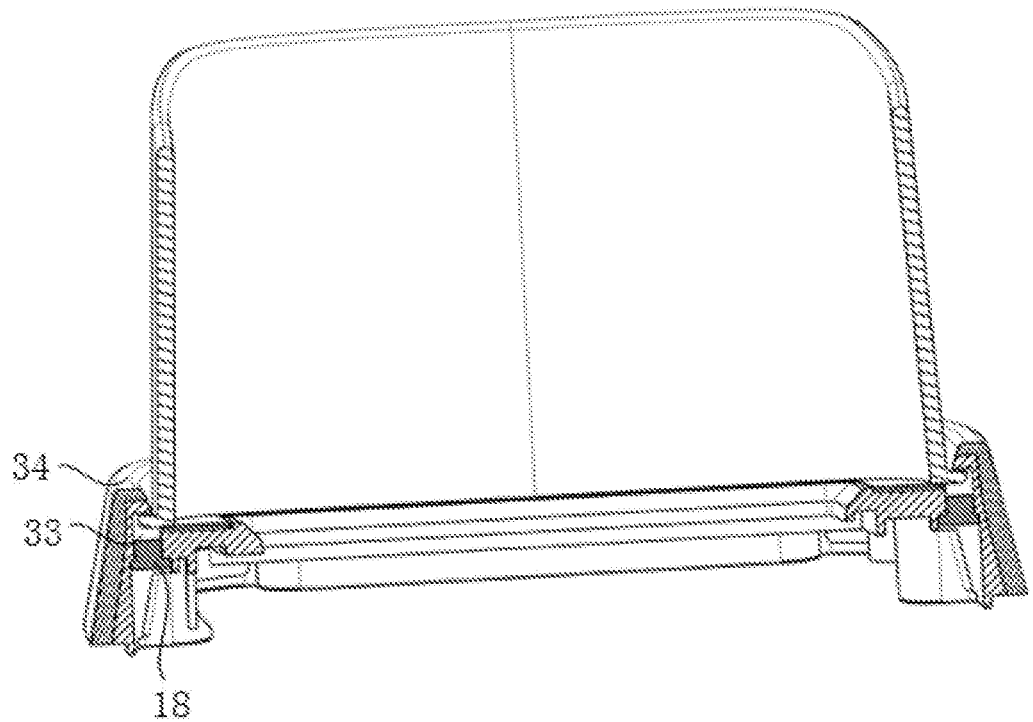
FIG. 16 is a schematic structural view of a seal provided on the first buckling portion according to an embodiment of the present application.

The ledge 34 can be bonded to the rear housing 32 to facilitate the installation of a sealing member 18 (as shown in FIG. 16) in the latching groove to reduce the possibility of dust, moisture, etc. entering the housing 3. The shape of the inner surface of the ledge 34 may be the same as the shape of the outer surface of a contact portion of the rear housing 32, and has a certain arc. The sealing member 18 may be a sealing block or the like, and is adhered to the ledge 34 and the rear housing 32 by an adhesive.

The electronic device 17 includes a movement 171 and a battery 172. The display screen 15 is connected to the movement 171, and the movement 171 is connected to the battery 172. The movement 171 is mounted on the front housing 31, and the battery 172 is mounted on a handle position of the housing 3.

The light-shielding cover 16 includes an upper cover body 161 provided above the display screen 15 and a side cover body 162 having an upper end connected to the upper cover body 161, and covering the side of the display screen 15. A side cover body 162 is provided at each end of the upper cover body 161, and the upper cover body 161 and the side cover body 162 smoothly transition at a connection portion.

Both the upper cover body 161 and the side cover body 162 are plate-shaped structures, and the outer surface of the upper cover body 161 and the outer surface of the side cover body 162 may have a certain arc. After the light-shielding cover 16 is fixed on the housing 3, the outer surface of the upper cover body 161 and the outer surface of the side cover body 162 are respectively in contact with the inner surface of the ledge 34 of the housing 3 at the corresponding position, so as to be able to support the light-shielding cover 16 through the ledge 34, improving the fixing fastness of the light-shielding cover 16.

At this time, the material of the light-shielding cover 16 may be a material capable of deforming, such as an engineering plastic material, so as to facilitate the second buckling portion 163 to be snapped into the first buckling portion 33. The color of the light-shielding cover 16 may be black, and the inside is sprayed with a matte paint, which can effectively prevent light from illuminating the inside of the light-shielding cover 16, thereby preventing reflection on the display screen 15 to affect the human eye to observe the image.

The second buckling portion 163 may be a lug and has a substantially rectangular flat plate structure. The upper cover body 161 and the side cover body 162 are each provided with a second buckling portion 163 to improve the fastness of the light-shielding cover 16 fixed to the housing 3. The upper cover body 161 may be provided with two second buckling portions 163 which are proximate to the two ends of the upper cover body 161. Each side cover body 162 is provided with a second buckling portion 163 which is proximate to the lower end of the side cover body 162 (where the lower end of the side cover body 162 is opposite to the upper end). In this way, after the light-shielding cover 16 is deformed, it is convenient to snap the second buckling portion 163 into the first buckling portion 33, and the fixing fastness of the light-shielding cover 16 can be improved.

The second buckling portion 163 is perpendicular to the surface of the light-shielding cover 16 on which it is located, that is, the second buckling portion 163 on the upper cover body 161 is perpendicular to the surface of the upper cover body 161 on which it is located, and the second buckling portion 163 on the side cover body 162 is perpendicular to the surface of the side cover body 162 on which it is located, so as to facilitate the second buckling portion 163 to be snapped into the first buckling portion 33. Of course, "perpendicular to" here is not an absolute 90 degrees, but may be slightly larger than 90 degrees (for example, 93 degrees) or slightly smaller than 90 degrees (for example, 85 degrees). The orientation of each of the second buckling portions 163 may be the same, for example, toward the rear of the housing 3, to facilitate the installation of the light-shielding cover 16.

When installing the light-shielding cover 16, the two side cover bodies 162 of the light-shielding cover 16 are grasped to apply a force to each of the two side cover bodies 162. The two side cover bodies 162 are bent and deformed toward each other, and the upper cover body 161 also generates a certain bending deformation. At this time, the second buckling portion 163 of the upper cover body 161 is engaged into the corresponding first buckling portion 33, and then the force applied to the side cover body 162 is canceled, and the deformation of the light shielding cover 16 is cancelled. The second latching portion 163 of the side cover body 162 is also engaged into the corresponding first latching portion 33, thereby completing the installation of the light-shielding cover 16.

When removing the light-shielding cover 6, the two side cover bodies 162 of the light-shielding cover 16 are grasped to apply opposing forces to the two side cover bodies 162. The two side cover bodies 162 are bent and deformed toward each other. At this time, the second buckling portion 163 of the side cover body 162 is detached from the first buckling portion 33. Then, the second buckling portion 163 of the upper cover body 161 is detached from the first buckling portion 33 to remove the light-shielding cover 16.

In the embodiment of the present application, the light-shielding cover can be detachably connected to the housing through the first buckling portion and the second buckling portion. On occasions such as cloudy days or indoors where light intensity is weak, when it is not necessary to use the light-shielding cover, the light-shielding cover can be removed from the housing, thereby reducing the possibility of the influence of the light-shielding cover on the imager.

In the current thermal imaging device, a trigger key assembly is generally provided. By controlling the trigger key assembly, the control circuit is turned on or off, so as to control the operation of the thermal imaging device. However, the trigger key assembly generally uses a linear pressing manner. When a touch switch or a travel switch inside the trigger key structure is touched, the reset after releasing the trigger is mostly realized by soft rubber or spring. The key structure of this linear movement manner is easy to jam, moreover, the internal spring will obviously weaken the feedback feeling of the key, which will cause the poor key experience of the entire trigger key assembly and affect human-machine experience of the entire product.

Figure 17:
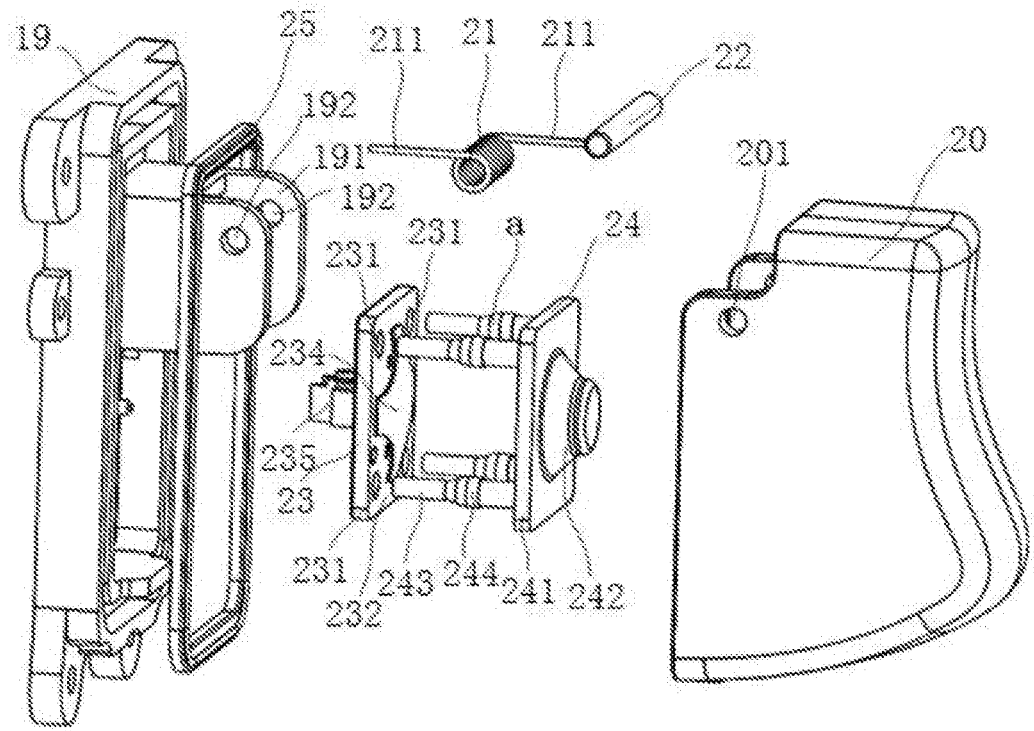
FIG. 17 is an exploded view of a trigger key assembly according to an embodiment of the present application.
Figure 18:
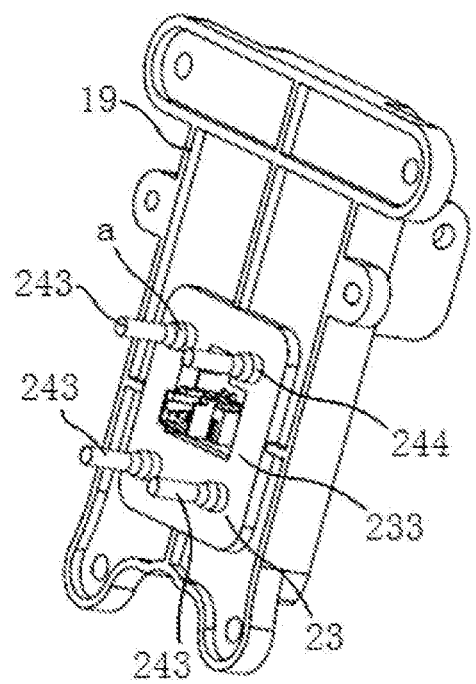
FIG. 18 is a schematic structural view from another perspective after the trigger key assembly in FIG. 17 is assembled.

Therefore, as shown in FIG. 17 and FIG. 18, a trigger key assembly provided by an embodiment of the present application includes a trigger fixing mount 19, a trigger 20, a key structure, and a rotating connection member 22. The key structure is provided between the trigger fixing mount 19 and the trigger 20 and can turn on or off a circuit when being pressed by the trigger 20. One end of the trigger 20 is provided on the trigger fixing mount 19 through a rotating connection member 22.

In the embodiment of the present application, one end of the trigger 20 is connected to the trigger fixing mount 19 by using the rotating connection member 22, so that the trigger 20 is movably mated with the trigger fixing mount 19 through the rotating connection member 22, so that the trigger 20 touches the key structure in a rotating manner after being pressed, which can effectively improve the pressing feel of the trigger 20, thereby achieving the effect of improving the trigger key experience.

The rotating connection member 22 may include a rotating shaft. In order to install the rotating shaft, a trigger mounting lug 191 is provided on the side of the mounting trigger 20 of the trigger fixing mount 19, and two spaced trigger mounting lugs 191 are provided with a rotating shaft mounting hole 192. Correspondingly, one end of the trigger 20 is provided with a rotating shaft mounting hole 201. When installing the rotating shaft, the rotating shaft mounting hole 192 of the trigger fixing mount 19 is aligned with the rotating shaft mounting hole 201 of the trigger 20, and one end of the rotating shaft is inserted from a rotating shaft mounting hole on one side into another rotating shaft mounting hole on the other side. At this time, both ends of the rotating shaft are rotatably installed in the mounting holes in which the trigger fixing mount 19 is aligned with the trigger 20 so that the other end of the trigger 20 can rotate around the rotating shaft. The rotating shaft may be made of materials with excellent wear resistance and oxidation resistance, which is wear resistant and has a long life.

The trigger key assembly may also include a reset member provided between the trigger fixing mount 19 and the trigger 20 to provide elastic force for the trigger 20 to recover and maintain the initial position after being pressed. The trigger 20 is spaced from the key structure at the initial position, thereby ensuring that the trigger 20 is released in time after being pressed down, and is disengaged from a switch contact portion of the key structure to avoid accidentally triggering the switch contact portion of the key structure. The distance between the trigger 20 and the key structure at the initial position can be determined according to actual situation.

Figure 19A:
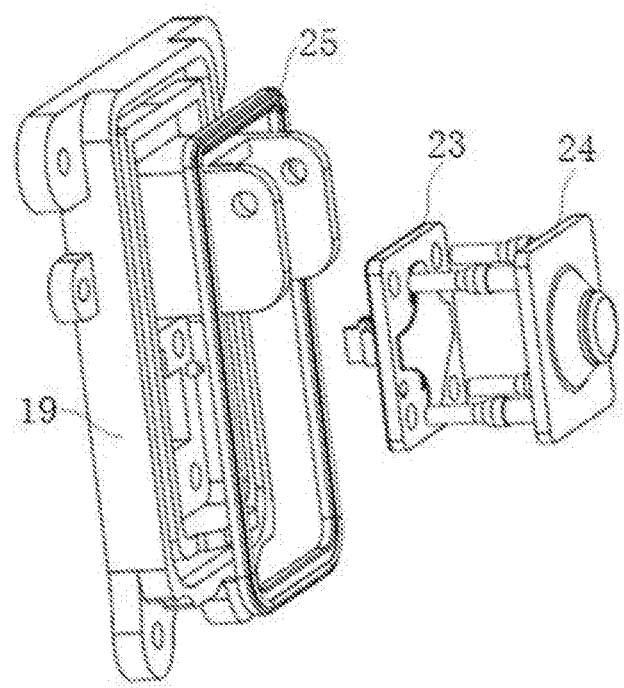
FIG. 19a is a schematic assembled view of a trigger fixing mount, a sealing gasket, a key structure, and a PCB board sealing gasket in the trigger key assembly of FIG. 17.
Figure 19B:
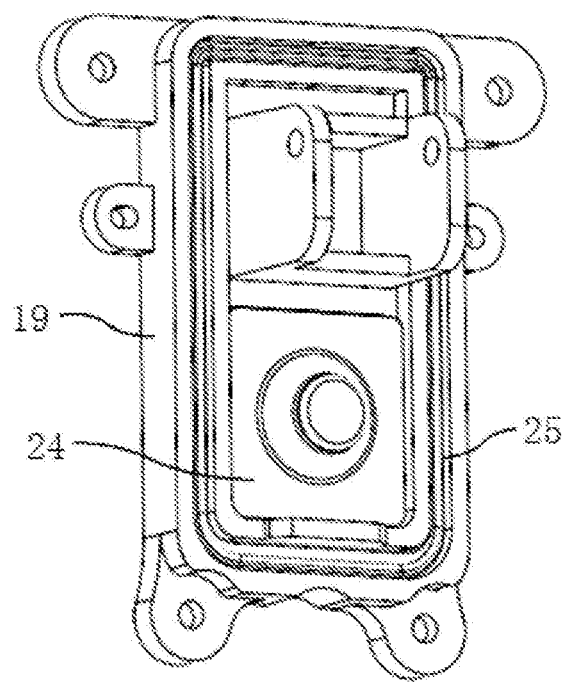
Figure 19C:
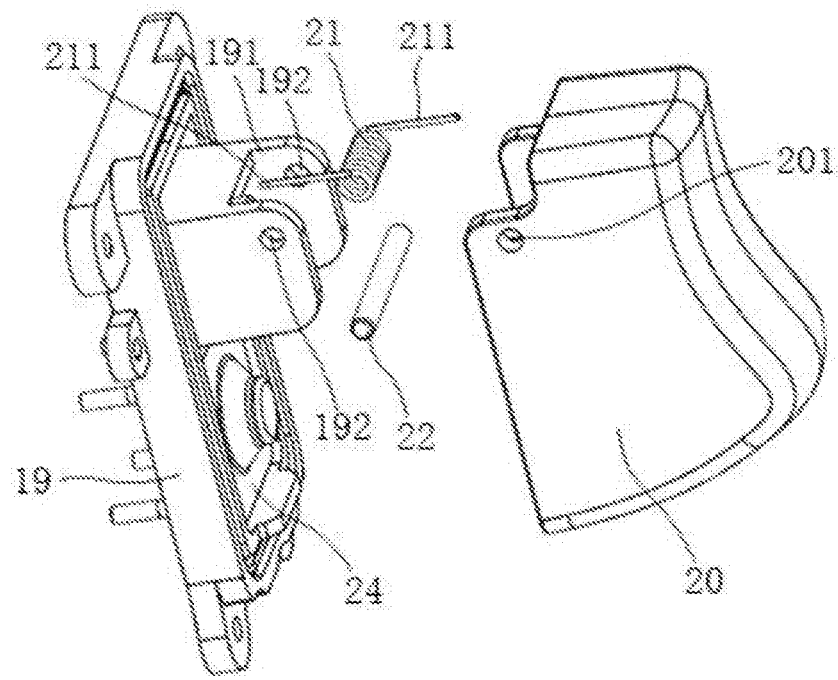
FIG. 19c is a schematic assembled view of the assembled components in FIG. 19b and a trigger, a rotating connection member and a torsion spring of FIG. 17.
Figure 19D:
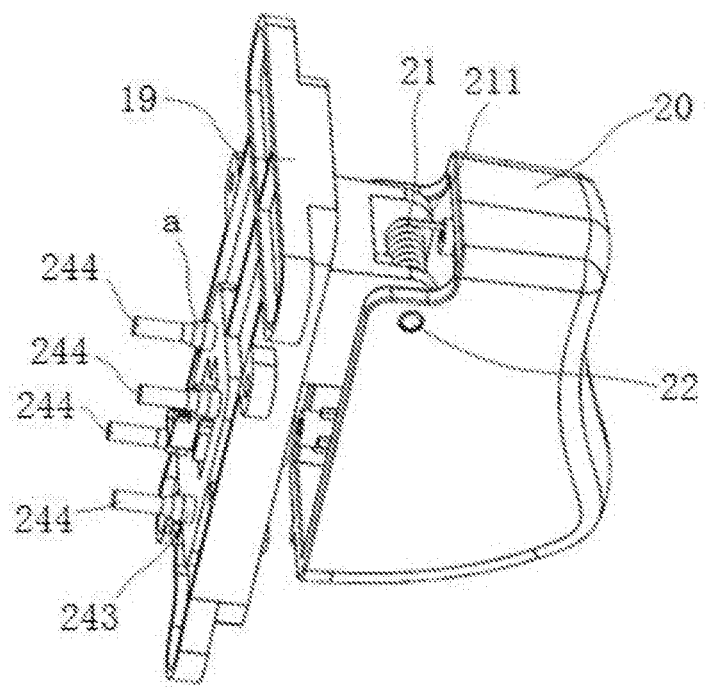
FIG. 19d is a schematic view after the trigger key assembly in FIG. 19c is assembled.

Referring to FIGS. 17, 19c and 19d, the reset member includes a torsion spring 21, which is sleeved on the outside of a portion of the rotating shaft between rotating shaft mounting holes, and torsion arms 211 at both ends of the torsion spring 21 abut against the trigger fixing mount 19 and the trigger 20. Specifically, the torsion arm 211 at one end of the torsion spring 21 is inserted into a torsion arm positioning hole 212 of the trigger 20, and the torsion arm 211 at another end of the torsion spring 21 is inserted into the torsion arm positioning hole (not shown in the figures) of the trigger fixing mount 19, which provides the elastic force for the trigger 20 to maintain at the initial position. The reverse force provided by the torsion spring 21 enables the user to more clearly feel the reset action of the trigger 20, which is beneficial to improve the effect of the trigger key experience.

Referring to FIGS. 17, 19a and 19b, the key structure is a key PCB (Printed Circuit Board) board 23, the key PCB board 23 may be a product directly purchased from the market. The trigger key assembly also includes a PCB board sealing gasket 24 that is adhered to one side of the key PCB board 23 by a sealant (such as 3M glue). The PCB board sealing gasket 24 can prevent the water accumulated in the trigger 20 from entering the key PCB board 23 and ensure the electrical performance of the key PCB board 23.

The PCB sealing gasket 24 may be made of a rubber material, and includes a cushion block 241. One side of the cushion block 241 is bonded to the first side 232 where the switch contact portion of the key PCB board 23 is located by a sealant. A pressing projection 242 is provided on the other side of the cushion block 241, and the pressing projection 242 is aligned with or corresponds to the position of the switch contact portion 234 of the key PCB board 23. Therefore, the pressing projection can apply a force to the switch contact portion 234 of the key PCB board 23 when being pressed by the trigger 20.

The key PCB board 23 may be provided with a mounting through-hole 231, for example, one mounting through-hole 231 is provided at each of four corners of the key PCB board 23. A mounting post 243 is provided on a side of the first side 232 of the key PCB 241 bonded to the key PCB 23 is provided with a mounting post 243. The outer side wall of the mounting post 243 is provided with a flange 244 having a diameter larger than the diameter of the mounting through-hole 231. The flange 244 passes through the mounting through-hole 231 from a first side of the key PCB board and is pressed against a second side 233 different from the first side 232 of the key PCB board 23 in the direction of the key PCB board 23. This is beneficial to the sealing performance of the PCB board sealing gasket 24 to the key PCB board 23. The second side 233 of the key PCB board 23 is provided with a socket 235 for forming an electrical connection with the main board in the thermal imaging device. After the switch contact portion 234 is pressed, the socket 235 turns on or off a circuit formed with the main board in the thermal imaging device.

As shown in FIG. 19d, the flange 244 may include a transition section a, and the outer diameter of the transition section a gradually increases from the outside to the inside with respect to the cushion block 241. This structure is beneficial to provide a fastening force for the adhesion of the PCB board sealing gasket 24 and the key PCB board 23 when the PCB board sealing gasket 24 is assembled on the first side 232 of the key PCB board 23.

Figure 19E:
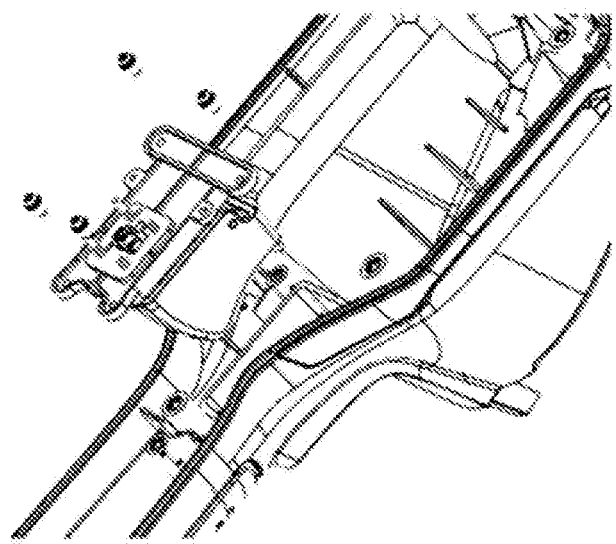
FIG. 19e is an assembly schematic view of the trigger key assembly in FIG. 19d being assembled to the housing.
Figure 19F:
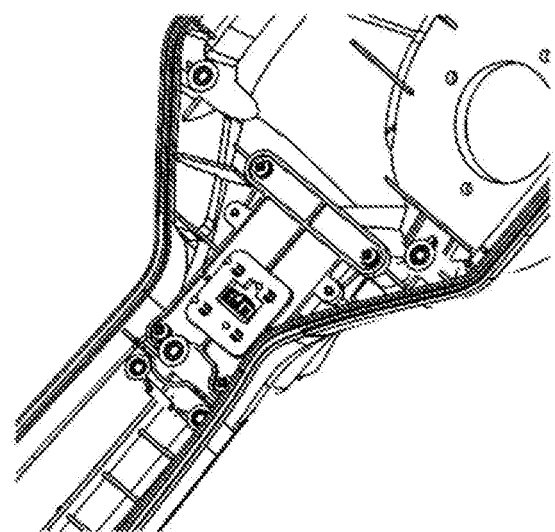
FIG. 19f is a schematic view of the trigger key assembly and the housing of FIG. 19e assembled into a thermal imaging device.
Figure 19G:
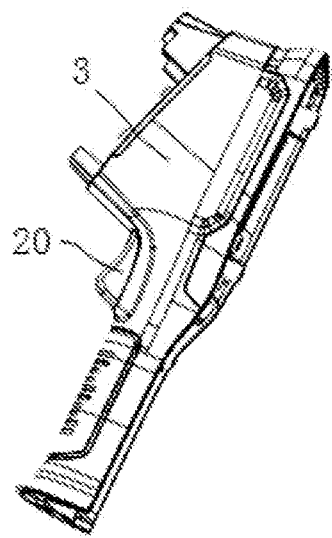
FIG. 19g is a schematic structural view of a thermal imaging device according to another embodiment of the present application.

As shown in FIGS. 19e, 19f and 19g, a thermal imaging device according to another embodiment of the present application may include a trigger key assembly, in addition to the housing 3, the lens mount 1, the lens 4, and the manual lens focusing structure as shown in FIG. 1, the display screen 15 and the light-shielding cover 16 as shown in FIG. 11.

The trigger fixing mount 19 of the trigger key assembly may be fixedly connected to any position of the housing 3 by a bolt member, and a sealing gasket 25 is provided between the trigger fixing mount 19 and the housing 3 to waterproof the housing 3. The shape of the sealing gasket 25 can be selected according to the size of the trigger fixing mount 19. The material can be selected from sealing ring material on the market.

In the embodiment of the present application, one end of the trigger is connected to the trigger fixing mount by using the rotating connection member, and the trigger is movably mated with the trigger fixing mount through the rotating connection member, so that the trigger touches the key structure in a rotating manner after being pressed, which can effectively improve the pressing feel of the trigger, thereby achieving the effect of improving the trigger key experience.

The above embodiments are only used to describe the technical solutions of the embodiments of the present application, and are not limited thereto. Those of ordinary skill in the art should understand that the technical solutions described in the foregoing embodiments may be modified, or some of the technical features are equivalently replaced; these modifications or replacements do not make the essence of the corresponding technical solution depart from the spirit and scope of the technical solutions of the embodiments of the present application.

What is claimed is:

1. A thermal imaging device, wherein the thermal imaging device comprises:
    a housing comprising a front housing;
    a lens mount, fixedly connected to the front housing, and wherein a sealing gasket is provided between the front housing and the lens mount;
    a lens, threaded with the lens mount;
    a manual lens focusing structure comprising a focusing wheel and an axial positioning structure, wherein the focusing wheel and the lens are connected to each other in a manner of synchronous rotation and relative axial movement; the axial positioning structure axially positions the focusing wheel such that the focusing wheel does not move axially during the focusing process;
    wherein the axial positioning structure comprises a limit seat and a rotating ring, the limit seat is fixedly connected to the housing, the rotating ring is rotatably sleeved on a radially outer side of the limit seat, and an axial position of the rotating ring relative to the limit seat is limited, wherein the focusing wheel is integrally connected with the rotating ring; the limit seat is fixed to the housing by a screw.

2. The thermal imaging device of claim 1, wherein the axial positioning structure further comprises a clamping ring, the clamping ring is threaded with one end of the limit seat, and the other end of the limit seat is provided with a radial expansion portion, and the rotating ring is sandwiched between the clamping ring and a radial expansion portion of the limit seat in the axial direction.

3. The thermal imaging device of claim 1, wherein the focusing wheel is fixedly connected to the rotating ring by a radially extending fastening screw.

4. The thermal imaging device of claim 1, wherein a grease groove is provided on a radially outer periphery of the limit seat.

5. The thermal imaging device of claim 1, wherein the limit seat comprises an outer peripheral wall, an inner peripheral wall and an annular plate connecting the outer peripheral wall and the inner peripheral wall, the rotating ring is rotatably sleeved on a radially outer side of the outer peripheral wall of the limit seat, a mounting through-hole is provided on the annular plate, and the screw is connected to the housing through the mounting through-hole.

6. The thermal imaging device of claim 1, wherein the focusing wheel is connected to the lens in a synchronous rotation manner through a keyway fit.

7. The thermal imaging device of claim 1, wherein a key is provided on an outer periphery of the lens, an inner wall of the focusing wheel is provided with an axial straight groove, the key and the axial straight groove mate with each other, the key can slide axially within the axial straight groove.

8. The thermal imaging device of claim 1, wherein a rear end face of the lens mates with the lens mount to form a rear axial limit of the lens; a key of the lens mates with an axial limit portion of the focusing wheel to form a front axial limit of the lens.

9. The thermal imaging device of claim 1, wherein an electronic device is provided inside the housing, and a first buckling portion is provided outside the housing;
the thermal imaging device further comprises:
a display screen provided on the housing and electrically connected to the electronic device;
a light-shielding cover provided with a second buckling portion, and the light-shielding cover is detachably disposed outside the housing through the first buckling portion and the second buckling portion, and shields the display screen.

10. The thermal imaging device of claim 9, wherein the light-shielding cover comprises an upper cover body provided above the display screen, and a side cover body with an upper end connected to the upper cover body and located on a side of the display screen, wherein the upper cover body and the side cover body are both provided with a second buckling portion;
the upper cover body is provided with two second buckling portions which are proximate to two ends of the upper cover body respectively;
the side cover body is provided with one second buckling portion which is proximate to the lower end of the side cover body;
the second buckling portion is perpendicular to a surface of the light-shielding cover where the second buckling portion is located.

11. The thermal imaging device of claim 9, wherein the housing is provided with a ledge on a side where the display screen is provided, wherein the ledge is provided around an outer periphery of the housing, the first buckling portion is a latching groove provided on the ledge; a sealing member connecting to the ledge and the housing is provided in the latching groove.

12. The thermal imaging device of claim 9, wherein the housing further comprises a rear housing fastened to the front housing through a groove and a convex rib, wherein the display screen and the light-shielding cover are both provided on the rear housing.

13. The thermal imaging device of claim 1, wherein the thermal imaging device further comprises a trigger key assembly, the trigger key assembly comprises a trigger fixing mount, a trigger, a key structure and a rotating connection member;
the key structure is provided between the trigger fixing mount and the trigger, and can turn on or off a circuit when being pressed by the trigger;
one end of the trigger is provided on the trigger fixing mount through a rotating connection member.

14. The thermal imaging device of claim 13, wherein the rotating connection member comprises a rotating shaft, the rotating shaft passes through a mounting hole in which the trigger fixing mount is aligned with the trigger.

15. The thermal imaging device of claim 13, wherein the trigger key assembly further comprises:
a reset member provided between the trigger fixing mount and the trigger, to provide elastic force for the trigger to recover and maintain at an initial position after being pressed, the trigger is spaced from the key structure in the initial position.

16. The thermal imaging device of claim 15, wherein the reset member comprises a torsion spring, which is sleeved outside a rotating shaft, and torsion arms at both ends of the torsion spring abut against the trigger fixing mount and the trigger, respectively.

17. The thermal imaging device of claim 13, wherein the key structure is a key PCB board, the trigger key assembly further comprises a PCB sealing gasket that is adhered to one side of the key PCB board by a sealant;
the PCB board sealing gasket is made of a rubber material and comprises a cushion block, one side of the cushion block is adhered to a first side where a switch contact portion of the key PCB board is located by a sealant, the other side of the cushion block is provided with a pressing projection, which can apply a force to the switch contact portion of the key PCB board when being pressed by the trigger;
the key PCB board is provided with a mounting through-hole, a mounting post is provided on a side surface of the cushion block adhering a first side of the key PCB board, the outer side wall of the mounting post is provided with a flange having a diameter larger than the diameter of the mounting through-hole, the flange passes through the mounting through-hole from the first side of the key PCB board and is pressed against a second side of the key PCB board that is different from the first side;
the flange comprises a transition section, and the outer diameter of the transition section gradually increases from the outside to the inside with respect to the cushion block.

18. The thermal imaging device of claim 13, wherein the trigger fixing mount is fixedly connected to the housing by a bolt, and a sealing gasket is provided between the trigger fixing mount and the housing.

* * * * *